United States Patent [19]

Farley et al.

[11] 4,451,098

[45] May 29, 1984

[54] BALL SEPARATOR ASSEMBLY

[75] Inventors: Wilbur H. Farley, Beverly; Alfred J. Kotek, Ipswich; John H. Carlson, Danvers, all of Mass.

[73] Assignee: USM Corporation, Farmington, Conn.

[21] Appl. No.: 411,826

[22] Filed: Aug. 26, 1982

[51] Int. Cl.$^3$ .............................................. F16C 33/38

[52] U.S. Cl. ................................ 308/201; 308/189 R; 308/217

[58] Field of Search .................... 308/201, 217, 189 R

[56] References Cited

U.S. PATENT DOCUMENTS

| | | | |
|---|---|---|---|
| 3,051,534 | 8/1962 | Kohler et al. | 308/201 X |
| 3,285,099 | 11/1966 | Parks, Jr. et al. | 308/201 X |
| 3,306,685 | 2/1967 | Bixby | 308/201 |
| 3,387,901 | 6/1968 | Williams | 308/217 |
| 3,586,405 | 6/1971 | Claesson | 308/201 |
| 3,944,307 | 3/1976 | Bingle | 308/217 |
| 4,054,340 | 10/1977 | Broshkevitch et al. | 308/217 |
| 4,262,979 | 4/1981 | Kispert et al. | 308/217 |

FOREIGN PATENT DOCUMENTS

| | | | |
|---|---|---|---|
| 977254 | 12/1964 | United Kingdom | 308/201 |

*Primary Examiner*—Stuart S. Levy
*Assistant Examiner*—Thomas R. Hannon
*Attorney, Agent, or Firm*—Donald N. Halgren

[57] ABSTRACT

A ball bearing separator assembly comprising an annular ball separator having partitions extending axially from one side thereof, which partitions are abuttable with an annular retention ring, thus forming a circumferential array of ball pockets for bearings.

The retention ring may have an axial array of fingers which snap into channels or voids in the partitions to lock them together. The ball separator in another embodiment may have pins which extend from the distal end of the molded separator partitions, which pins may mate with corresponding orifii in the retention ring. The pins may be distorted after mating with their respective orifii to secure the retention ring to the distal ends of the partitions on the ball separator.

The annular body portions of the separator and its associated retention ring may be of reduced radial dimension adjacent the ball pockets thereof, to permit flexure of the separator assembly during rotation with a bearing about non-circular harmonic drive-type wave generator mechanisms.

2 Claims, 5 Drawing Figures

64
64
66
60
a1
74
70
74
66
72
68
78
76
a1
70
76
r1
66
72
62

BALL SEPARATOR ASSEMBLY

BACKGROUND OF THE INVENTION (1) Field of the Invention

This invention relates to the provision of separators for antifriction rolling elements, and is more especially concerned with providing improved ball separators for use in radially flexible bearings. The invention is thus particularly well adapted for use in transmissions or actuators of the type employing generators for imparting a radial wave of deflection, commonly known as harmonic drive transmissions or strain wave gearing.

(2) Prior Art

Harmonic drive actuators customarily include in concentric relation three elements: a circular spline, a flexspline engaging externally or internally with the circular spline, and a wave generator for radially deflecting the flexspline to effect such engagement at spaced circumferential points. One element in this compact transmission assembly may serve as input and another may function as the output. The present invention has particular application to a novel bearing assembly to be interposed between the flexspline and the wave generator to render generation of the wave shaping more efficient.

In conventional annular ball bearings a separator is usually journalled on one of a pair of concentric race rings or may ride on the balls confined thereby. These commercially available separators may be formed with closely fitting, circumferentially spaced ball pockets for receiving and guiding the respective balls in raceways of the rings. While experience indicates that reasonably good performance may be expected of such bearings in some harmonic drive transmissions, the tendency is for the radially moving rolling elements in the load region of their circumferential travel to pinch or bind the separator, and provide undue wear. This problem is acknowledged in U.S. Pat. No. 3,285,099, which is assigned to the assignee of the present invention. This design however, shows a retaining ridge or platen for holding the separator axially in position. These components add inertia to the high speed rolling elements, which inertia is undesirable, because inertia slows down the response time of the components comprising the system in which they operate.

Since the wave generator bearing may be elliptical (or trichoidal) in shape, the rolling elements thereabout move at varying radii and having a varying angular velocity. The prior art bearing separators have not minimized the inertia in strain wave gearing systems, nor have they provided a simple, inexpensive rolling element ring which is easy to assembly which provides long service life for motion in a non-circular path.

In view of the foregoing, it is an object of the present invention, to provide, for use in a deflectable, out-of-round bearing, a more economical rolling element separator which shall be capable of reducing friction losses, and reduce the inertia over current bearing assemblies.

It is a further object of the present invention, to provide a moldable separator, which permits mid-assembly inspection, which separator itself is easily assembled, and which readily adapts to a non-circular locus of motion.

BRIEF SUMMARY OF THE INVENTION

The present invention relates to ball bearing separators in radially flexible ball bearing assemblies.

Harmonic drive actuators as aforementioned, may have an elliptoidal wave generator around which the ball bearing assembly is arranged. The ball bearing assembly is also arranged in relation to a flexspline having gear teeth which are radially deflectable into contact with gear teeth of a stationary spline. The ball bearing assembly comprises an inner race, an outer race, and a plurality of rolling elements, preferably balls, held by a separator assembly, thereinbetween.

The separator assembly may be comprised of a ball separator and an axial retention ring. The ball separator comprises an annular body member having a plurality of axially arranged partitions disposed in a radially directed array spaced on one side thereof. Each pair of adjacent partitions has an arrangement of curved walls sufficient to maintain a ball therebetween, and which, with the annular body and retention ring defines a ball pocket. Each pocket is also of sufficient size to permit ball precession to occur without the ball binding with the ball separator, when the separator assembly is used in conjunction with an elliptoidal or trichoidal wave generator member in a harmonic drive assembly.

The axially arranged partitions extending off the annular member, may each have a notch arranged near their proximal end on their radially innermost side thereof. A channel or void is formed in the partition, from the distal side of the notch, axially towards the distal end of the partition. The axial retention ring has a plurality of axially arranged fingers spaced on one side thereof, in juxtaposition with the partitions on the ball separator. The axial retention ring is coaxially matable with the ball separator, to form the separator assembly. The fingers on the axial retention ring mate respectively with the channels on the radially innermost side of the partitions. A lip is arranged radially outwardly on the distal end of each finger. The lip is shaped in an inverted "V" form to mate with the notch in the partition. Rotation of the bearing and corresponding rotation of the separator assembly causes centrifugal forces in the finger to "lock-in" the lip into the notch.

The bearing unit may be assembled with the ball separator spaced between the inner and outer bearing races of the bearing assembly. The ball bearings may then be placed into the bearing pockets defined by the adjacent partitions. At this juncture in the assembly process, the proper clearances between the inner and outer races and the ball bearings and maybe even the unit on which the bearing assembly mates, may be observed and evaluated. Satisfactory inspection and pre-assembly will then permit the axial retention ring to be placed onto the ball separator, and snapped into place.

The separator assembly, in a further embodiment, may be adaptable to ball bearing assemblies in which the separators themselves are radially deflectable. That is, those assemblies in harmonic-drive type units, wherein the inner or outer race would be engagable with an elliptoidal or trichoidal generator to cause an advancing deflection wave therein, as shown in U.S. Pat. No. 3,285,099. The separator assembly, in such an embodiment, would include the ball separator and the axial retention ring, as aforementioned. The ball separator and axial retention ring however, may each have circumferentially spaced portions of their annular bodies, cyclically tapering to reduced radial dimensions, from radially thicker dimensions and tapering back again to thicker portions, to allow flexing at those spaced thinner portions. The portions of pinched or reduced radial dimensions would be arranged between adjacent partitions. The radial dimension of the reduced portions would be less than the axial dimension of those reduced portions, that is, the width, of the annular body portions of the ball separator and the axial retention ring. The partitions in this embodiment, would still have concave surfaces to define a ball pocket, but the ball pockets need only be large enough to permit entrance of the ball during assembly, because precession does not occur in these embodiments, due to the radial flexing of the separator assembly in the radially flexible bearing assembly permitted by the circumferentially spaced pinched annular body portions by virtue of engagement of the partition walls with the balls.

A further embodiment of a ball bearing separator assembly includes a separator member having axially arranged partitions on one side thereof, as well as a separate retention ring which butts against the distal ends of the partitions. There are however, axially arranged pins extending from the distal ends of the partitions which mate with corresponding spaced axially arranged orifii on the retention ring. The pins are molded with the entire separator member, from a thermoplastic material. After the ball members have been assembled in their appropriate pockets and the pins have mated with their corresponding openings or orifii in the retention ring, the distal ends of the pins may be distorted by heating means, or the like, to prevent the retention ring from separating from or loosening from the ball separator. The body portions of the ball separator and the retention ring in this embodiment may also have pinched segments of reduced radial dimension between adjacent partitions and their corresponding segments on the retention ring, as did one of the aforementioned embodiments, to permit flexing or bending of the separator assembly during motion thereof, thus accommodating the non-circular curvature of a harmonic drive type wave generator.

BRIEF DESCRIPTION OF THE DRAWINGS

The objects and advantages of the present invention will become more apparent, when viewed in conjunction with the following drawings, in which.

DESCRIPTION OF THE PREFERRED EMBODIMENTS

Figure 1:
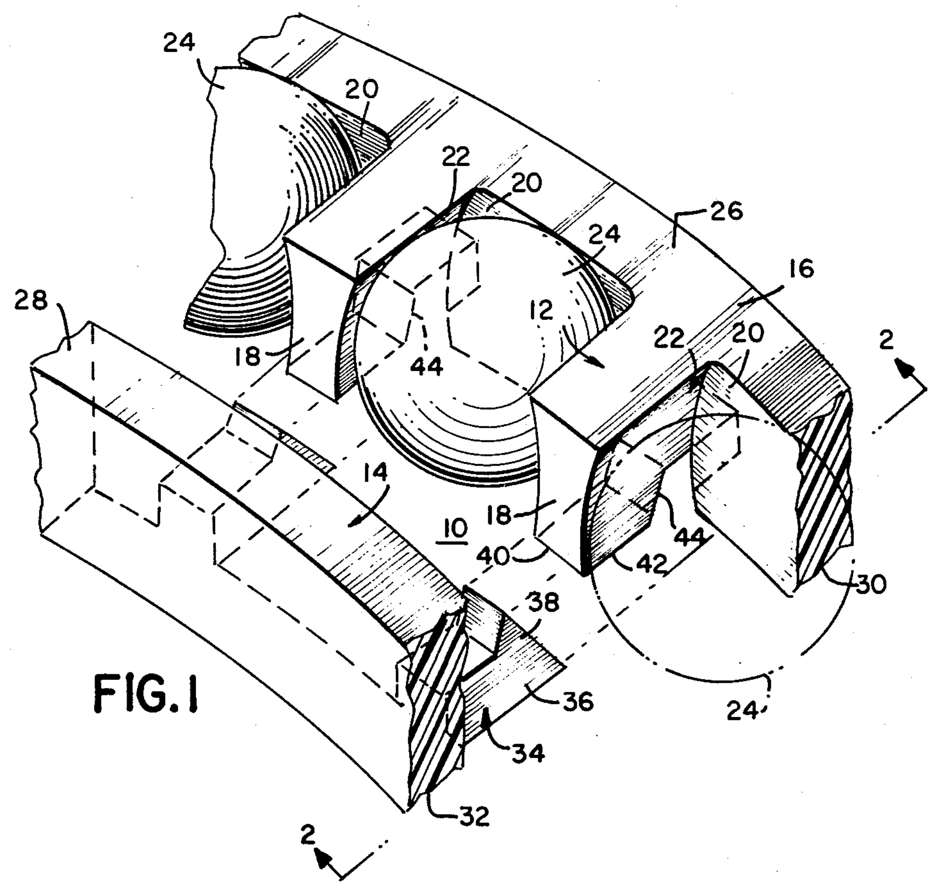
FIG. 1 is a perspective view of a portion of a ball bearing separator assembly constructed according to the principles of the present invention.

Referring now to the drawings in detail, and particularly to FIG. 1, there is shown a ball bearing separator assembly 10, rotatable about an axis, not shown, transverse thereto, which assembly 10 includes, a ball separator 12, and an axial retention ring 14. The ball separator 12 comprises an annular body member 16 with a plurality of axially arranged partitions 18 circumferentially spaced on one side thereof. A ball pocket 20 is defined as the generally cubically shaped volume disposed between adjacent partitions 18. Each partition 18 has a generally radially directed wall surface 22 on each side thereof. Each wall surface 22 however, is concave in shape, and when paired together with a facing wall surface 22 of an adjacent partion, prevents radial excursion of a ball 24 therefrom. Each concave wall surface 22 is of sufficient radial dimension, depending on the size of the particular balls 24 used, and each ball pocket 20 is of sufficient arcuate dimension to permit ball precession to occur, without allowing the ball to bind with respect to the ball separator 12. This was discussed in U.S. Pat. No. 3,285,099, and is herein incorporated by reference.

The ball separator 12 and the retention ring 14 have a radially outermost peripheral surface 26 and 28 respectively, and they each have a radially innermost peripheral surface 30 and 32, respectively.

The retention ring 14 has a plurality of fingers 34 annularly arranged on one side thereof, as shown in FIG. 1, directed towards the ball separator 12. The fingers 34 are generally parallel with the axis of rotation of the ball bearing separator assembly 10, and are each arranged to interdigitate respectively with one of the partitions 18 of the ball separator 12. Each finger 34 comprises a main body portion 36 extending from the side of the retention ring 14 and having a radially innermost surface which is coplanar with the innermost surface 32 of the retention ring 14. A lip or tab 38 of generally inverted "V" configuration extends generally radially outwardly from the distal end of the main body portion 36 of each finger 34.

Figure 2:
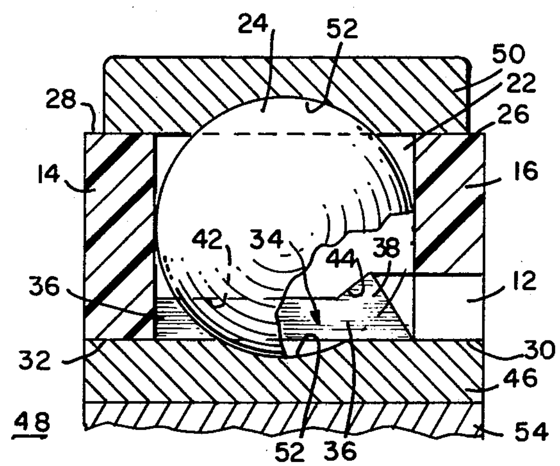
FIG. 2 is a view of a ball bearing assembly taken along the lines II—II of the separator assembly of FIG. 1.

Each partition 18 has a channel or void 40 on its radially innermost portion which may receive a finger 34. Each void 40 is defined by a radially innermost surface 42 having a stepwise configuration 44, as shown in FIGS. 1 and 2 and the radially outermost surface of an inner race 46 of a ball bearing unit 48, shown partially in FIG. 2. The stepwise configuration 44 of the innermost surface 42 of each partition 18 permits the interdigitable mating between each finger 34 and its respective partition 18.

The ball bearing unit 48, shown with the retention ring 14 and separator 12 assembled in FIG. 2, also comprises an outer race 50. The inner and outer races 46 and 50 each have a trough-shaped channel 52 in which the balls 24 may run. The ball bearing unit 48 is shown arranged about a central member 54.

Assembly of a ball bearing unit 48, would comprise the steps of placing the ball separator 12 in coaxial alignment between the coaxially arranged inner and outer race 46 and 50, depositing seratum the ball bearings 24 in their respective ball pockets 20, then checking the pro forma assembly for proper fit and alignment, thus permitting quality inspection. The retention ring 14, would then be aligned with the ball separator 12, so that the fingers 34 are in axial and radial alignment with the partitions 18, and the retention ring would then be pushed into place, the tabs 38 mating with the stepped configuration 44 of the radially inner surface 42 of each partition 18. The snapping interdigitation would insure the locking therebetween.

During rotation of the ball bearing separator assembly 10, centrifugal force causes each of the fingers 34 to press more tightly against the radially innermost surface 42 of the partition, further increasing their interlocking capabilities.

Figure 3:
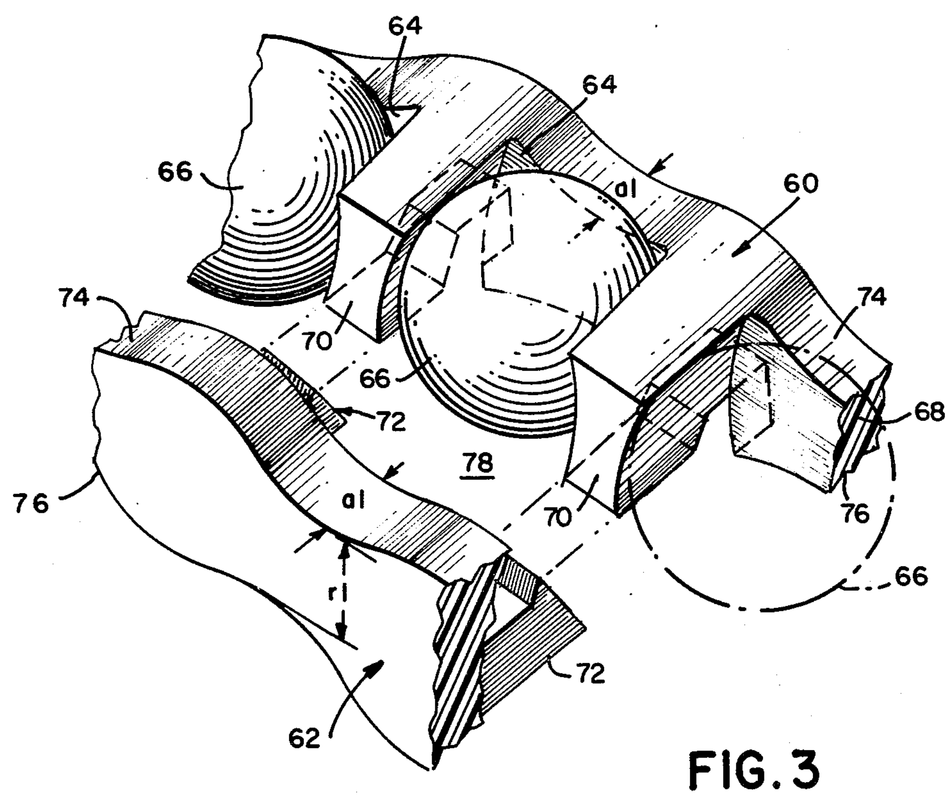
FIG. 3 is a perspective view of a portion of an alternative embodiment of a ball bearing separator assembly.

Another embodiment of the above-identified ball bearing separator assembly 78 is shown in FIG. 3, having a ball separator 60 which mates with a retention ring 62 as in one of the aforementioned embodiments. This embodiment however, includes a plurality of ball pockets 64 which mate more snugly with a ball 66 of a given size which will not allow significant ball precession during rotative travel around a harmonic drive type wave generator. The ball separator 60 comprises an annular body member 68 of reduced radial dimension at spaced circumferential localities, that is, between adjacent partitions 70. The retention ring 62 is of corresponding reduced radial dimensions at corresponding spaced circumferential localities, that is between adjacent fingers 72. The ball separator 60 and the retention ring 62 have outer and an inner surfaces 74 and 76 respectively, which define the reduced radial dimensions, those dimensions being stepped, curved or tapering from the radially thickest portions axially adjacent each partition 70 to the radially thinnest portions axially adjacent each ball pocket 64 and then being stepped, curved or tapering to the radially thickest portions axially adjacent each partion 70 (or finger 72) to begin the cycle anew. The radially smallest dimension r1 of the ball separator 60 and retention ring 62 being less than the axial dimensions a1 thereof, as shown in FIG. 3, ($r1 \geqq a1$).

The reduced radial dimension of the ball separator 60 and the retention ring 62, which reduced radial dimensions are in axial alignment, permit a bearing assembly 78, which comprises the ball separator 60 and the retention ring 62 and balls 66, to bend at the points of reduced radial dimension, permitting their use in bearing assemblies around harmonic drive type wave generators of non-circular (elliptoidal or trichoidal) configuration exemplified by central members 54 of FIG. 2. The concavely curved walls of the partitions 70 by virtue of their snug engagement with the balls 24 as shown particularly in FIG. 5, cause the separator 60 and the ring to follow the non-circular path of the balls.

Figure 4:
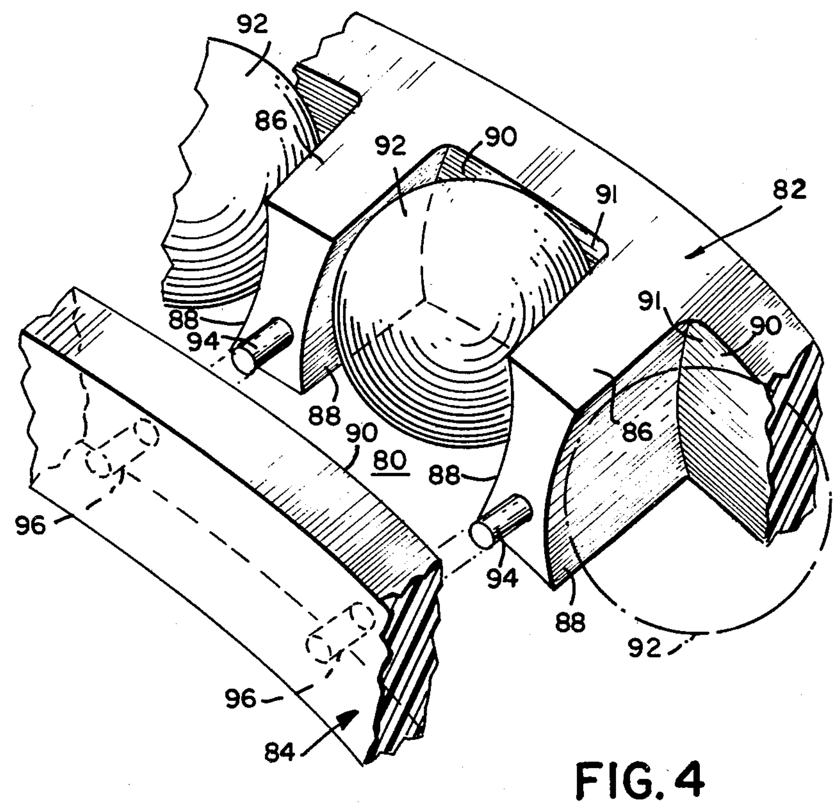
FIG. 4 is a perspective view of a portion of an alternative preferred embodiment of a ball bearing separator assembly.

A preferred further embodiment, is shown in FIG. 4, wherein a ball bearing separator assembly 80 comprises a ball separator 82, and a retaining ring 84. The ball separator 82 includes a plurality of axially disposed partitions 86 extending off one side thereof, as shown in the aforementioned embodiments. The partitions 86 each have a pair of curvilinear sides 88 as the aforementioned embodiments, which define, along with an axially transverse wall 90 of the body of the ball separator 82 and the retaining ring 84, a ball pocket 91, properly sufficient in size to retain a particular ball 92 therein, and of proper arcuate dimension to permit precession of each ball 92 with respect to the ball pocket 91 during rotation about a harmonic drive type wave generator. Each partition 86 may be of full radial dimension, (without the voids or channels of the aforementioned embodiments) which dimension is enough to secure the ball therebetween and be of the same radial dimension as the retention ring 84. A pin 94, molded from the same material and in the same mold as the ball separator 82, extends axially from the distal end of each partition 86, as shown in FIG. 4. An orifice or channel 96 is axially arranged and spaced circumferentially within the retention ring 84, corresponding to the positioning of each pin 94 molded into the ball separator 82.

During assembly of the ball bearing separator assembly 80, after the particular balls 92 have been inserted into their respective ball pockets 91, the retention ring 84 is fitted onto the ball separator 82 by insertion of the pins 94 through their respective channels 96 in the retention ring 84. The distal ends of the pins 94 which extend beyond the ring 84 may then be distorted or enlarged by known means, such as heating, to facilitate abuttable securement of the retention ring 84 against the distal ends of the partitions 86, thus completing assembly of the ball bearing separator assembly 80.

Figure 5:
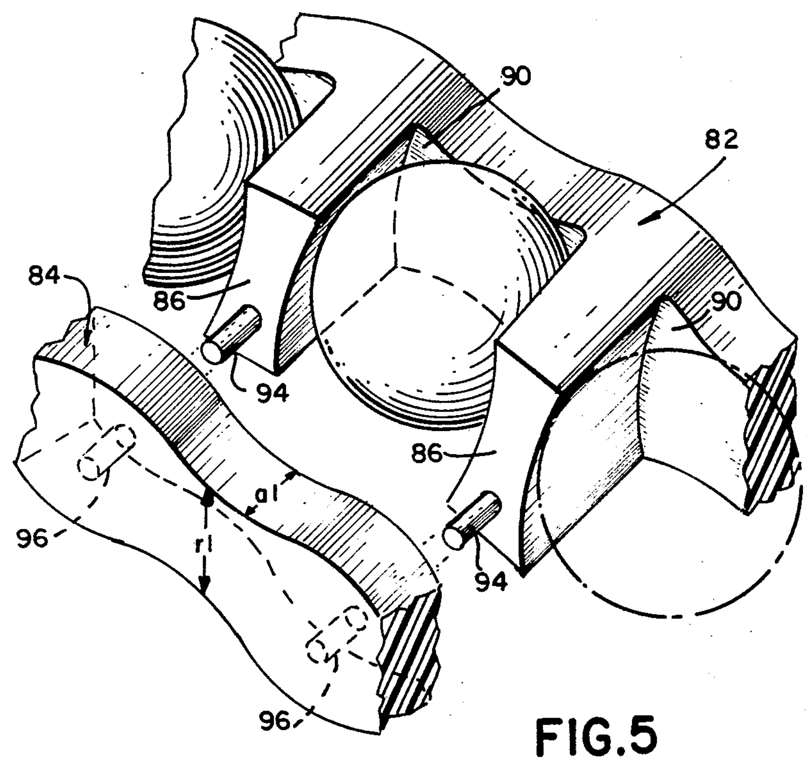
FIG. 5 is a perspective view of a further embodiment of FIG. 4.

The pinned ball separator 82 and retention ring 84, may have portions of their radial dimensions pinched or reduced at circumferentially spaced portions between their adjacent partitions 86, as shown in FIG. 5, and as was described in an earlier embodiment. If this configuration is chosen, the ball pockets 91 may be of the type described in the second embodiment, which is the close-fitting type, not permitting ball precession during movement around a harmonic drive-type wave generator, but which ball separator "bends" (with the pinched retention ring) to accommodate the non-circular contours of that particular non-circular wave generator and follow the path of the balls.

Thus there has been shown several ball bearing separator assemblies which may be molded from plastic material, and which permit ball inspection prior to final assembly, and which separator assemblies minimize imbalance and torque problems in ball bearing assemblies which are undersirable in high speed harmonic drive type mechanisms.

Though the invention has been described with a certain degree of particularity, it is intended that the appended claims be interpreted in a descriptive and not a limiting sense.

We claim:

1. A ball bearing separator assembly which can accommodate a non-circular configuration imposed by a wave-generator, comprising:

a flexible annular ball bearing separator having a plurality of axially arranged partitions circumferentially spaced on one side thereof;

a flexible annular retention ring matable with said partitions, thereby defining a plurality of spaced ball pockets therearound, both said separator and said retention ring having their radially inner and their outer surfaces curved to produce an assembly having reduced radial dimensions between adjacent partitions to facilitate manufacture and flexing thereof; and integral heat distortable interlocking means for securing said axially arranged partitions and said retention ring, to permit said separator and said retention ring to bend together.

2. A ball bearing separator assembly as recited in claim 1, wherein said flexible ball bearing separator and said retention ring each have their reduced radial dimension portions being of a smaller dimension than their respective axial dimensions.

* * * * *